UNITED STATES PATENT OFFICE.

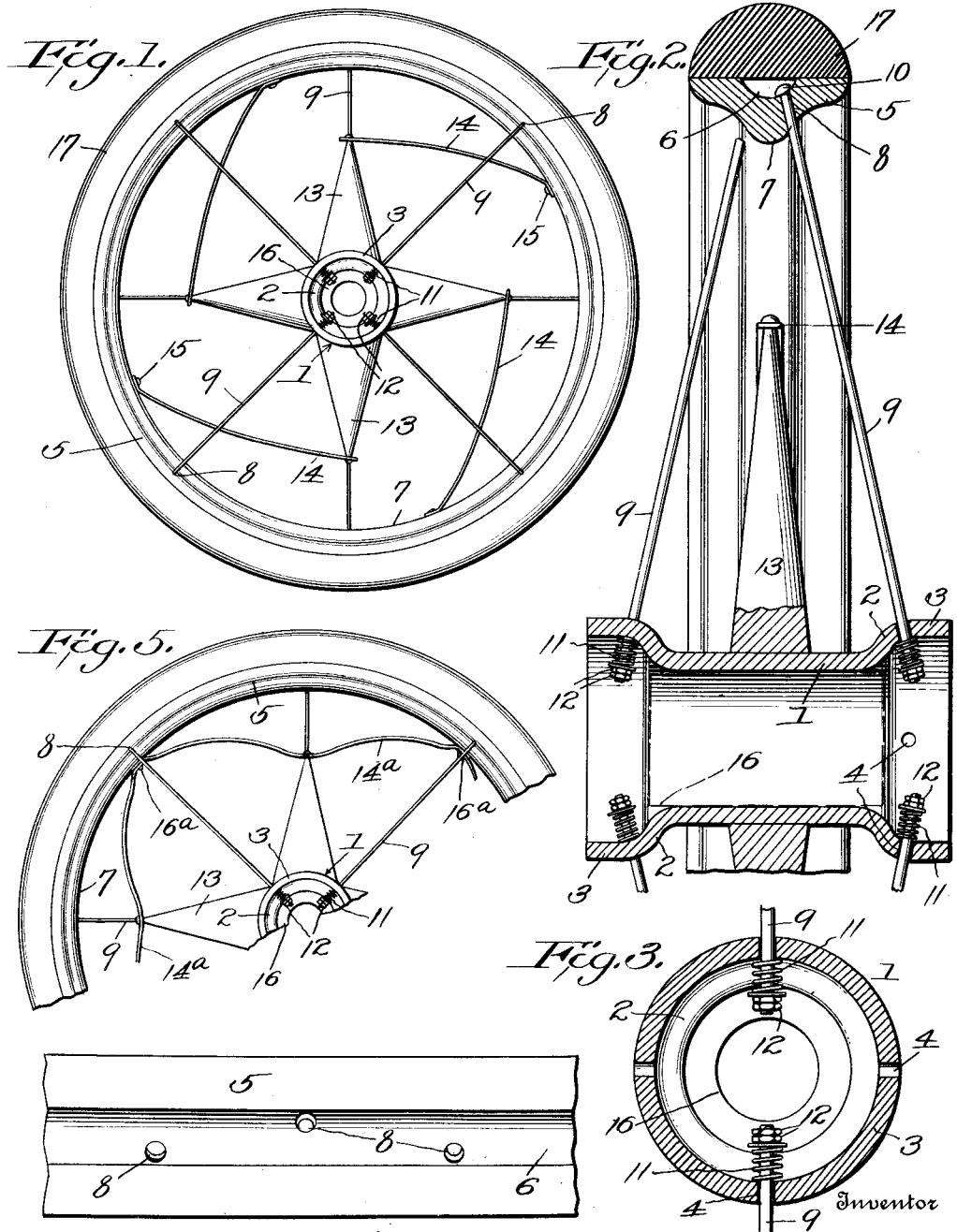

GROSVENOR S. ANDRUS, OF RANGE, OREGON.

SPRING-WHEEL.

1,071,543.  Specification of Letters Patent.  Patented Aug. 26, 1913.

Application filed November 2, 1911. Serial No. 658,271.

*To all whom it may concern:*

Be it known that I, GROSVENOR S. ANDRUS, citizen of the United States, residing at Range, in the county of Grant and State of Oregon, have invented certain new and useful Improvements in Spring-Wheels, of which the following is a specification.

The present invention relates in general to vehicle wheels, and has for its primary object to provide a wheel which may be constructed entirely of metal and which embodies novel features of construction whereby all shocks and jars are absorbed in substantially the same manner as is the case with those wheels provided with pneumatic tires.

A further object of the invention is to provide a wheel of this character which is comparatively simple and inexpensive in its construction, which can be easily repaired in case of accident, and in which the resiliency may be adjusted to suit the conditions under which the wheel is operated.

A still further object of the invention is to provide a wheel of this character in which the load is entirely carried by the spokes in the upper half of the wheel, thereby preventing pounding upon and consequent crystallization of the spokes in the lower half of the wheel.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a side elevation of a wheel constructed in accordance with the invention. Fig. 2 is an enlarged vertical sectional view through the upper portion of the wheel. Fig. 3 is an enlarged transverse sectional view through one of the hub flanges. Fig. 4 is a plan view of a portion of the rim with the tire removed, and Fig. 5 is a side elevation showing a slightly modified form of the invention, a portion of the wheel being removed.

Corresponding and like parts are referred to in the following description and indicated in all the views of the drawing by the same reference characters.

Referring to the drawings, the numeral 1 designates the hub casing which is substantially cylindrical in shape and has the opposite ends thereof flared at 2 and provided with annular outstanding flanges 3, the said flanges being formed at suitable intervals with the spoke receiving openings 4.

The rim 5 is formed upon the exterior thereof with an annular groove 6 and upon the interior thereof with an inwardly projecting annular rib 7 which corresponds to the groove and is arranged under the same. Arranged at predetermined points and alternately positioned along opposite sides of the groove 6 are the spoke openings 8 which pass through the rim. The spokes 9 preferably have the outer ends thereof hot riveted within the openings 8 of the rim and are provided at their outer extremities with the heads 10 which are received within the grooves 6. The inner ends of the spokes 9 pass loosely through the spoke openings 4 of the hub flanges and receive coil springs 11 which are interposed between the interior of the hub flanges and nuts 12 threaded upon the spokes. The spokes are also slightly resilient so as to bend readily without breakage should such become necessary, and the springs 11 serve to absorb the shocks and jars so as to prevent the same from being transmitted to the vehicle. The nuts 12 may be tightened or loosened to adjust the tension of the springs 11 as may be found necessary or desirable.

A series of pointed arms 13 project from the central portion of the hub casing 1 and are received between the alternate spokes on opposite sides of the wheel. These arms 13 are flattened and arranged in a plane at right angles to the axis of the hub casing, the inner ends of the arms being widened so as to form in effect a star shaped web surrounding the hub. The outer ends of the arms are pointed and secured to the free ends of spring strips 14, the opposite ends of the said spring strips being rigidly secured to the interior of the rim 5 as indicated at 15. The spring strips 14 coöperate with the springs 11 to absorb the shocks and jars and prevent the same from being transmitted through the axle to the vehicle.

An axle boxing 16 is designed to be fitted securely within the hub casing 1, and a tire 17 will be securely shrunk upon the rim 5. This tire is preferably formed of weldable material so that in the event the tire should slip it can be readily welded and repaired.

A slight modification is shown in Fig. 5, in which the outer ends of the hub arms 13 are secured to intermediate portions of spring strips 14ᵃ which have opposite ends thereof secured to the rim at 16ᵃ. A slightly more rigid construction is thus obtained, and in practice it is contemplated to use the construction shown in Fig. 1 for the front wheels of a vehicle, and the construction shown in Fig. 5 for the rear wheels of a vehicle. In a power driven vehicle, the drive wheels would always be constructed as shown in Fig. 5, since the thrust thereon would be better resisted than with the other construction.

Having thus described the invention, what I claim as new and desire to secure by Letters Patent, is:—

A spring wheel comprising a cylindrical hub casing having its opposite ends flared and provided with annular flanges arranged in a plane parallel with the body of the casing, a rim, spokes secured at one end to said rim and having their outer ends extending loosely through the flanges on said hub casing and provided with shock absorbing springs, said spokes being arranged alternately with the inner end of one engaging one flange of the hub casing and the other the other flange, a star shaped web fixed to said casing intermediately of its ends and having the points thereof arranged between alternate spokes, and resilient strips connecting the free ends of said points to said rim.

In testimony whereof I affix my signature in presence of two witnesses.

GROSVENOR S. ANDRUS.

Witnesses:
ELMER A. SHIELDS,
CHAS. A. COE.

Copies of this patent may be obtained for five cents each, by addressing the "Commissioner of Patents, Washington, D. C."